United States Patent [19]
Baud

[11] 3,857,137
[45] Dec. 31, 1974

[54] PROCESS AND DEVICE FOR EXTRACTING BLOOD FROM SLAUGHTERED ANIMALS

[76] Inventor: Roger Baud, Prangins(Vaud), Switzerland

[22] Filed: Dec. 13, 1972

[21] Appl. No.: 314,597

[30] Foreign Application Priority Data
Dec. 22, 1971 Switzerland....................... 18792/71
Mar. 8, 1972 Switzerland......................... 3487/72

[52] U.S. Cl................................................. 17/1 C
[51] Int. Cl. ...................................................... A22c
[58] Field of Search ....................................... 17/1 C

[56] References Cited
UNITED STATES PATENTS
3,292,205 12/1966 Rizzi..................................... 17/1 C
3,649,996 3/1972 Marti..................................... 17/1 C

*Primary Examiner*—G. E. McNeill
*Attorney, Agent, or Firm*—Emory L. Groff, Jr.

[57] ABSTRACT

A device for extracting blood from slaughtered animals includes a cutting tool having a tubular body with a cutting blade at one end and a flexible tube communicating the other end with a hollow receptacle maintained at low pressure by a compressor. The tool also has a movable guard piece including means such as grippers or a sucker for holding the tool in place when the blade is pierced into an animal, for example in its neck in the region of the aorta and upper vena cava. Suction is then applied to the wound to activate the flow of blood through the tubular body into the receptacle.

5 Claims, 7 Drawing Figures

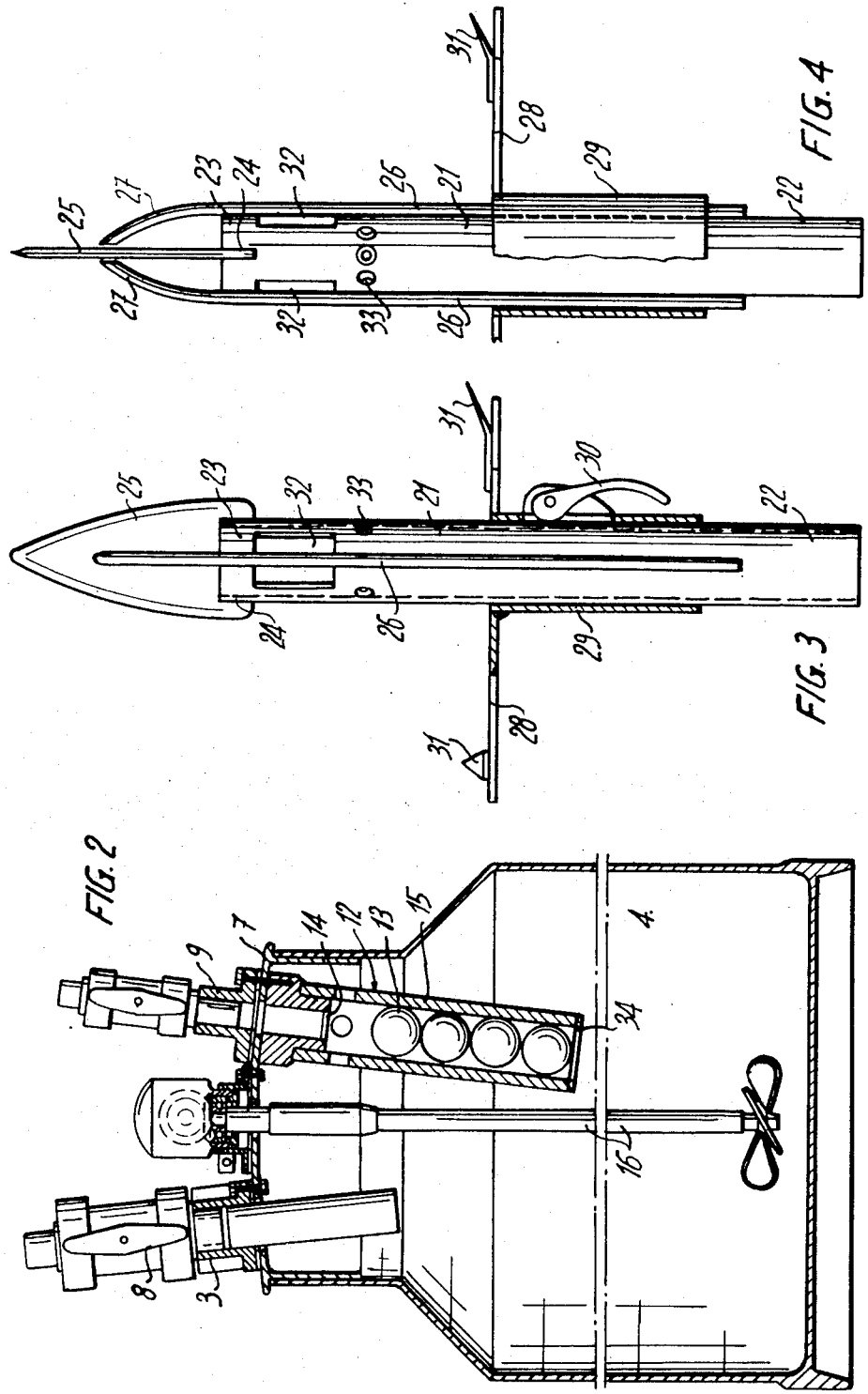

PROCESS AND DEVICE FOR EXTRACTING BLOOD FROM SLAUGHTERED ANIMALS

The invention relates to the extraction of blood from slaughtered animals.

Amongst the known methods of slaughtering animals for butchery, one of the most common consists of felling them for example by means of a slaughtering pistol and then bleeding them by cutting their necks in the region of the arch of the aorta and the upper vena cava.

Relatively small animals such as pigs are generally suspended by their hind legs during bleeding and it is thus easy to collect their blood in basins with a view to the manufacture of black pudding. Such bleeding is more complete than that which can be carried out on larger animals such as oxen, which are bled in a laying down position.

It is known that the quality of butcher's meat is improved when the animals have been bled as fully as possible. Moreover, blood has a high protein content useful as raw material for the manufacture of foodstuffs.

According to the invention, a process for extracting blood from a slaughtered animal comprises cutting the animal for example at its neck in the region of the arch of the aorta and the upper vena cava, applying a suction to the cut to activate the flow of blood, and collecting the blood in a receptacle maintained at low pressure.

According to another aspect of the invention, there is provided a device for extracting blood from slaughtered animals, comprising a cutting tool including a tubular body, a blade at one end of the tubular body, means for communicating the other end of the body with a receptacle, and means for maintaining the recipient at low pressure, whereby in operation when the blade is pierced into an animal, for example, at its neck in the region of the arch of the aorta and the vena cava, a suction is applied to the cut to activate the flow of blood through said tubular body and the blood collects in the receptacle.

The accompanying schematic drawings show, by way of example, an embodiment of the device according to the invention and several variations thereof. In the drawings:

FIG. 2 is an enlarged scale axial cross-section through the receptacle;

FIGS. 3 and 4 are partly cut away front and side elevational views of the cutting tool shown on an enlarged scale;

Figure 1:
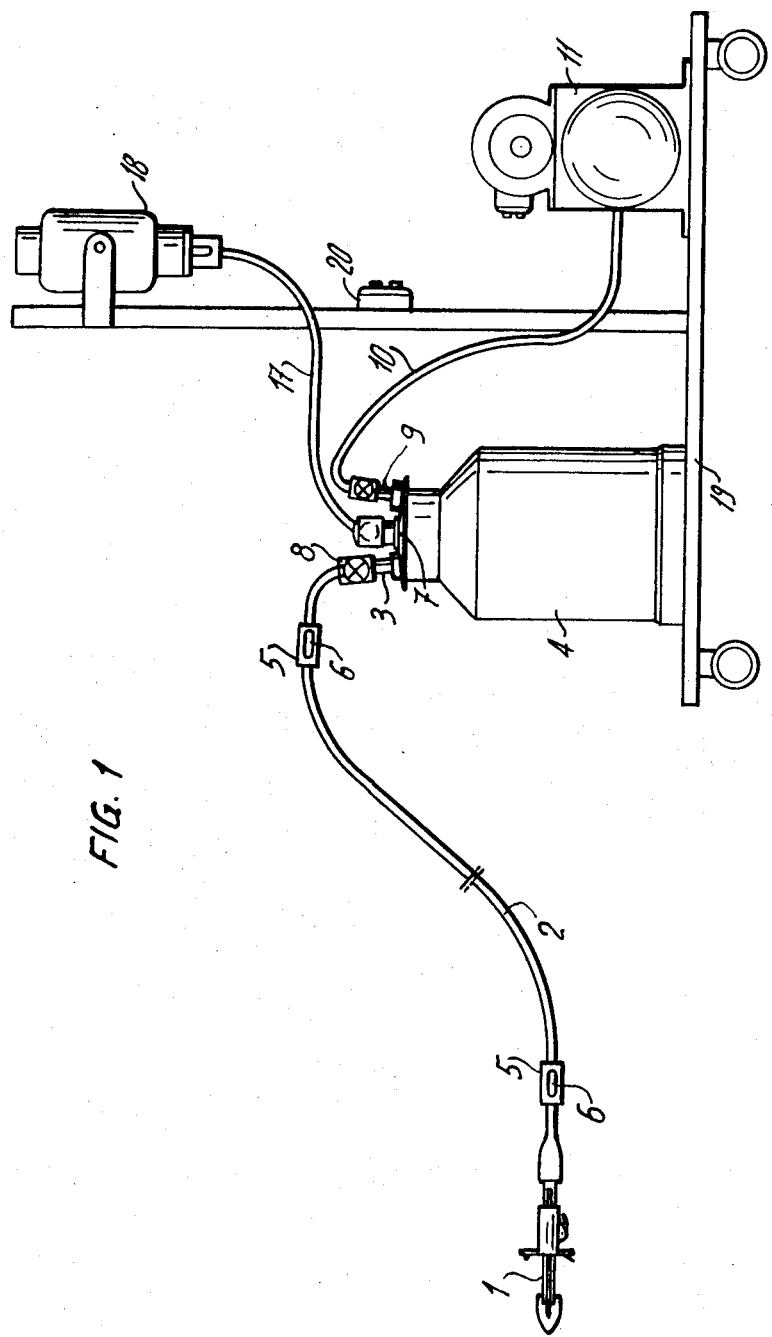
FIG. 1 is an overall elevational view of the device.

The device shown in FIG. 1 comprises a cutting tool 1 having a tubular handle connected by a flexible tube 2 to a neck 3 for the inlet of blood into a hollow metal can 4 provided with a removable fluid-tightly closed top cover 7.

Successive sections of the flexible tube 2 are connected by joints 5 each having a window 6 for observation of the flow of blood. The inlet neck 3 mounted on the cover 7 of can 4 (see FIG. 2) is provided with a valve 8.

A second neck 9 also mounted on the cover 7 of can 4 enables the latter to be connected by means of a flexible tube 10 to the suction end of a compressor 11. This neck 9 is provided with a safety valve 12 adapted to close it automatically when the blood collected in can 4 reaches a certain level. The clapper of valve 12 is formed by the upper one 13 of a set of four table tennis balls movably lodged in a sleeve 15 mounted in extension of neck 9 inside cover 7, the upper ball 13 being applied against a seat 14 when the blood in can 4 reaches the maximum permitted level.

A stirrer 16 is also mounted inside the cover 7 and is connected by a transmission cable 17 to the shaft of an electric motor 18.

The assembly of the can 4, compressor 11 and motor 18 is arranged on a trolley 19 which can be moved about a slaughter-house to any convenient work position. The compressor 11 and motor 18 are connected to a switch box 20 on trolley 19, this switch box being itself connectable to an electric supply point by means of a cable and plug (not shown).

The tool 1, shown on an enlarged scale in FIGS. 3 and 4, comprises a tube 21, preferably made of stainless steel, adapted to be connected by one of its ends 22 to tube 2. The other end 23 of tube 21 has two longitudinal slots 24 provided in a median plane of the tube 21, in which slots a pointed cutting blade 25 is secured.

Two air inlet tubes 26, curved towards one another at one of their ends 27 on either side of blade 25, are welded to the outer surface of tube 21 and extend longitudinally thereof in a plane perpendicular to the plane of slots 24 and terminate short of end 22.

A laterally projecting guard piece 28 is integral with a sleeve 29 slidably mounted about tube 21 and can be locked on tube 21 at a required distance from the blade 25 by means of a cam-operating locking lever 30. Guard piece 28 carries hooking members adapted to penetrate into the skin of the neck of an animal to be bled so as to fix the tool 1 during bleeding. Diametrically opposed openings 32 and 33 are also provided in the wall of tube 21 in the neighbourhood of its end 23 to which the blade 25 is fixed.

Operation of the described device is as follows:

The compressor 11 and motor 18 are switched on and the neck of a freshly slaughtered animal is cut in the region of the arch of the aorta and the upper vena cava by driving in the blade 25 of tool 1. The tube 21 is forced into the cut up to the guard piece 28 and, by a slight rotation of tube 21 in the clockwise direction, the hooking members 31 are made to penetrate into the skin of the animal's neck to fix the tool 1.

The blood escaping from the aorta and the vena cava cut by blade 25 is sucked into the can 4 as a result of the suction applied to the cut by means of compressor 11. The blood penetrates into tube 21 by its end 23 and/or by either or both of orifices 32 and 33, then flows through tube 2 and is collected in can 4. To prevent the suction applied to the wound from causing a stoppage of the out-flow of blood, air is simultaneously admitted to the wound in the neighborhood of blade 25 via tubes 26.

Mixing of the blood in can 4 by means of stirrer 16 prevents coagulation thereof.

When the level of blood collected in can 4 reaches the lower opening 34 of sleeve 15, the table tennis balls in the sleeve 15 are lifted up and the upper ball 13 is applied against the seat 14 of valve 12, which stops the suction of blood into can 4.

To continue bleeding, it thus suffices to remove the cover 7 from can 4 and place it on an empty can.

Of course, when the collected blood is intended to be centrifuged for separation of the plasma, the mixing of the blood by stirrer 16 could at least partially be replaced by the addition of an anti-coagulant.

The quantity of blood thus collected varies from 5 to 25 litres per animal, according to its size, and is well above that which would normally flow from slits in the necks of slaughtered animals, notably when the latter are not suspended by their hind legs. Also, the described process and device enable animal's blood to be collected in hygienic conditions, which is not always the case with the previously used processes.

Numerous variations of the device shown in FIGS. 1 to 4 may be envisaged.

The motor 18 could, for example, be fixed onto the cover 7.

Instead of being planar, the blade 25 of tool 1 could be transversally undulated to better penetrate the flesh, or longitudinally ribbed to facilitate the flow of blood towards tube 21.

In a tool 1 intended solely for extracting blood from animals suspended by their hind legs, the air inlet tubes 26 could be eliminated, since the effect of gravity prevents the wound from closing on blade 25.

Figure 5:
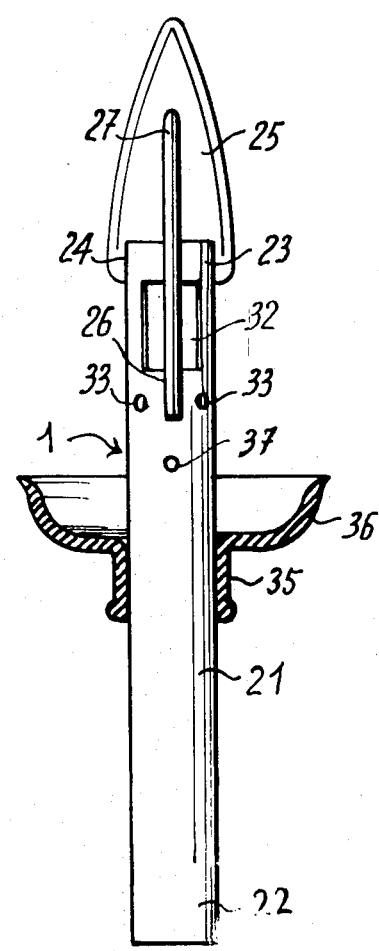
FIGS. 5 and 6 are views similar to FIG. 3 of modified cutting tools.

As shown in FIG. 5, a laterally protruding guard piece includes a sleeve 35 which flares out in the shape of a suction cup 36 facing blade 25 and is slidably mounted on tube 21, short of rods 26 and openings 32, 33, 37. This guard piece is preferably provided in rubber or a flexible elastic synthetic plastics material, so that the free edge of its flared suction cup 36 can be applied in a fairly fluid-tight manner against the neck of an animal to be bled, about the periphery of a cut made by blade 25 by driving in the tool 1. Because of its elasticity, the sleeve 35 is mounted in a fairly fluid-tight manner on tube 21, but nevertheless remains axially movable along the latter.

This guard piece 35, 36 enables the tool 1 to be firmly held in place in a would made in the neck of an animal to be bled, as soon as the installation is placed under low pressure. The blood which flows along the edges of the wound is collected in the flared part 36 of the guard piece and is sucked through openings 37, 33 and 32 into the tube 21.

The rods 26 are of a similar disposition to tubes 26 is the first embodiment, but are solid and do not extend beyond the guard piece 35, 36. These rods serve primarily to hold the wound open; they could, however, be replaced by air-supply tubes 26 similar to those of FIGS. 3 and 4.

Figure 6:
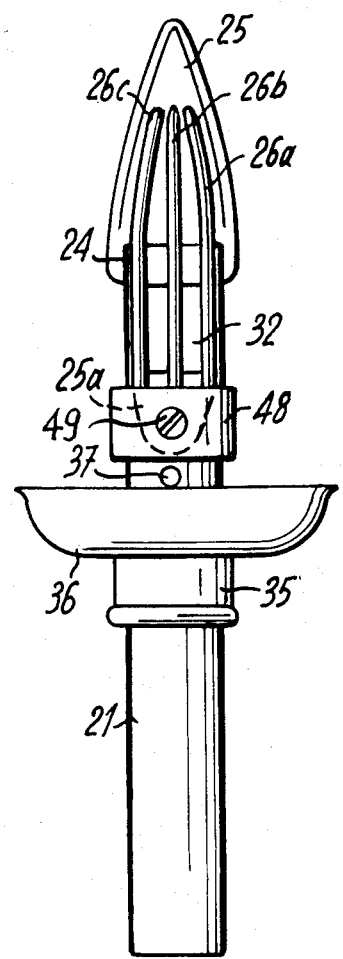

According to the variation shown in FIG. 6, the previous rods or air-supply tubes 26 are replaced by a crown-like array of two sets of three curved rods 26a, 26b, 26c mounted on a sleeve 48 which can be fitted on tube 21 by means of two gripping screws 49 engaging in two threaded bores of sleeve 48. These screws 49 preferably penetrate through two diametrically opposed holes pierced in tube 21 and engage an extension 25a of the blade 25,, the screws 49 thus simultaneously holding the blade 25 in slots 24 of tube 21. Moreover, cleaning of the tool is facilitated because the crown-like set of rods 26a, 26b, 26c can be cleaned separately. The two sets of rods 26a, 26b and 26c are disposed on either side of blade 25 and thus enable the animal's flesh to be held well apart of blade 25, which accelerates bleeding.

Numerous other variations of the sucker-forming part can be envisaged.

It could, for example, be provided in metal with the free edge of its flared part having a rim of flexible or spongy metarial.

Instead of providing a circular free edge, the flared part of the sucker-forming guard piece could have an oval edge adapted to closely over the part of the animal's necks against which it is applied.

Figure 7:
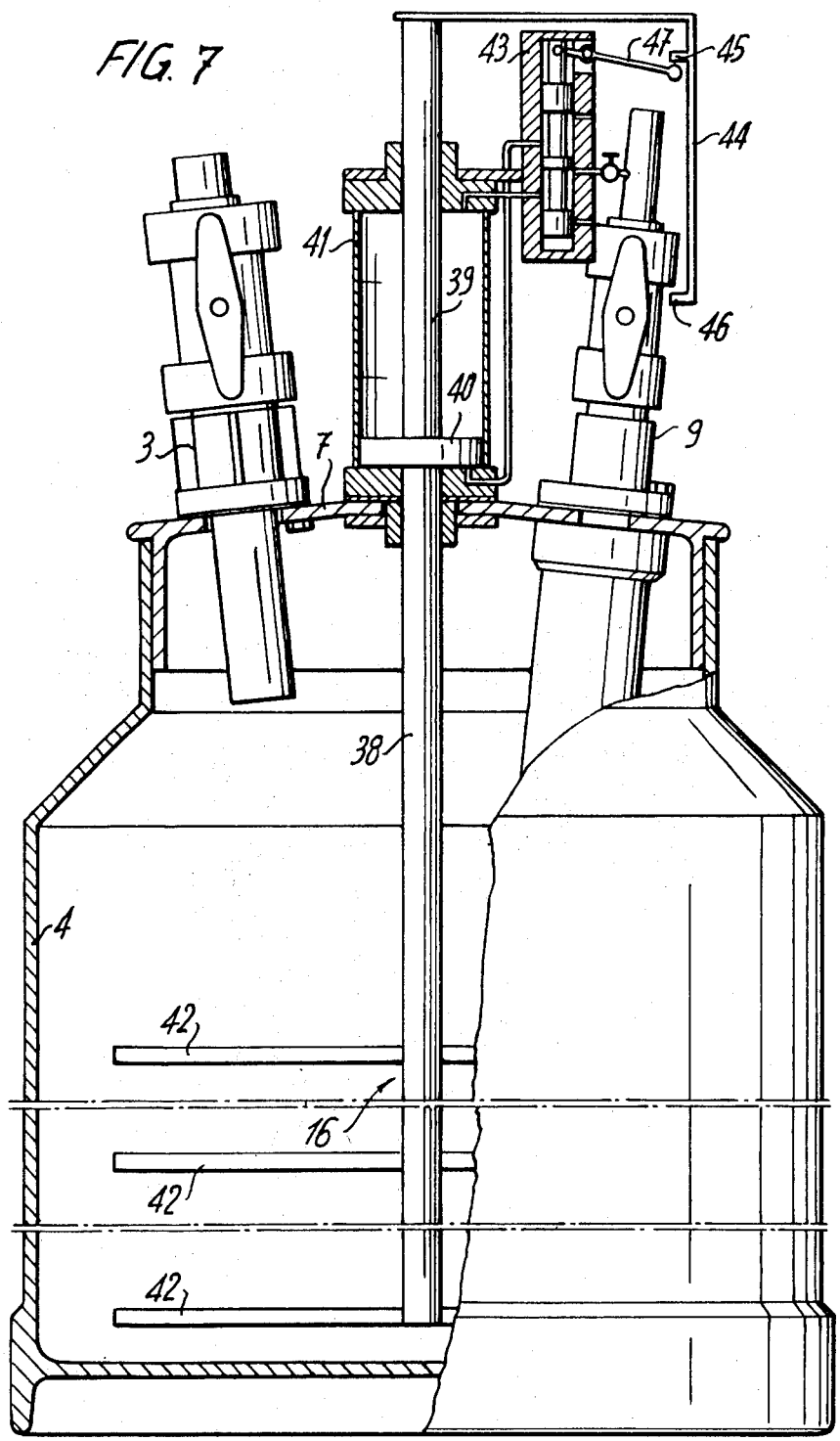
FIG. 7 is a view similar to FIG. 2 of a modified receptacle.

As shown in FIG. 7, the stirrer 16 may be formed by a rod 38 mounted coaxially in extension of a rod 39 of a piston 40 slidably mounted on the outer face of cover 7. The rod 38 of stirrer 16 is provided with a series of blades 42 inside and extending partially across can 4.

The ends of cylinder 41 communicate with a drawer or slide valve 43 which is connected to the air suction end of a compressor adapted to keep the can 4 at a low pressure.

The free end of rod 39 of piston 40 is provided with a rod 44 for controlling the slide valve 43 via two stops 45, 46 adapted to actuate a lever 47 of valve 43. When the free end of lever 47 is down, as shown, the upper face of piston 40 is subjected to the low pressure produced by the compressor and the lower face of the piston 40 is subjected to air pressure, so that the piston is driven upwards. When the free end of lever 47 is raised, the upper face of piston 40 is subjected to air pressure, and the lower face to the low pressure, so that the piston is driven down.

It is thus possible to stir the blood in can 4 with an up-and-down movement provided pneumatically solely by means of air pressure and the suction of the compressor used for holding the can 4 at low pressure.

Alternatively, the inlet of slide valve 43 previously communicating with the air could be connected to the compressed air output of the compressor. Thus, instead of being driven by suction, the stirrer 16 would be driven by compression and suction. A further alternative would be to connect the inlet of slide valve 43 previously connected to the suction end of the compressor to the compressed air output of the compressor.

Of course, the mobile compressor 11 could be eliminated and replaced by a central installation with suction points located about the slaughterhouse.

I claim:

1. A device for extracting blood from slaughtered animals comprising a cutting tool including a tubular body open at first and second ends, a blade at the first end of said tubular body, a crown-like array of rods removably mounted on said tubular body and disposed on either side of said blade, a guard piece adjacent the first end of said tubular body and projecting laterally therefrom, said guard piece including a sleeve surrounding said tubular body and slidable thereon, said sleeve flared outwardly toward said blade to provide a cup-shaped portion to be applied in a substantially fluid-tight manner against the neck of an animal to be bled, means connecting the second end of the body with a receptacle, and means for maintaining the receptacle at low pressure and for applying a suction to a cut made by piercing said blade into an animal, for example, in its neck in the region of the arch of the aorta and the upper vena cava to activate the flow of blood through said tubular body into the recipient.

2. A device according to claim 1 wherein said tubular body is provided with a plurality of openings in the area of said cup-shaped portion to permit blood collected therein to be sucked into said tubular body.

3. A device according to claim 1, wherein the sleeve of said guard piece is made of a flexible elastic material.

4. A device according to claim 1, wherein the sleeve and cup-shaped portion of the guard member are made of rubber.

5. A device according to claim 1, wherein the sleeve and cup-shaped portion of the guard piece are made of flexible synthetic plastic material.

* * * * *